United States Patent
Karaffa et al.

(10) Patent No.: US 8,952,804 B2
(45) Date of Patent: Feb. 10, 2015

(54) SYSTEMS AND METHODS TO OVERLAY ADDITIONAL INFORMATION ONTO FOUNDATION FIELDBUS ALERTS

(75) Inventors: John Michael Karaffa, Roanoke, VA (US); Johnny Stephen Downor, Salem, VA (US); Steven William Smith, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 853 days.

(21) Appl. No.: 13/149,764

(22) Filed: May 31, 2011

(65) Prior Publication Data

US 2012/0306638 A1    Dec. 6, 2012

(51) Int. Cl.
*G08B 23/00* (2006.01)
*G05B 19/042* (2006.01)

(52) U.S. Cl.
CPC ................................. *G05B 19/0425* (2013.01)
USPC ......... 340/517; 340/506; 340/3.1; 340/539.1; 340/539.11

(58) Field of Classification Search
CPC ................. G05B 2219/31438; G05B 23/0267; G05B 23/027; G05B 2219/31121; G05B 2219/31135; G05B 2219/31469; G05B 2219/36137; G05B 23/0272; G05B 23/0275
See application file for complete search history.

(56) References Cited

U.S. PATENT DOCUMENTS

| | | | |
|---|---|---|---|
| 2002/0163427 A1* | 11/2002 | Eryurek et al. | 340/500 |
| 2008/0168356 A1* | 7/2008 | Eryurek et al. | 715/736 |
| 2008/0255681 A1* | 10/2008 | Scott et al. | 700/12 |
| 2008/0294771 A1* | 11/2008 | Hermes et al. | 709/224 |
| 2009/0277374 A1* | 11/2009 | Schie et al. | 116/109 |
| 2010/0123722 A1 | 5/2010 | Grubbs et al. | |
| 2012/0101600 A1* | 4/2012 | Schrier et al. | 700/80 |
| 2012/0310381 A1* | 12/2012 | Karaffa et al. | 700/80 |

OTHER PUBLICATIONS

U.S. Appl. No. 13/149,789, filed May 31, 2011, Karaffa et al.
U.S. Appl. No. 13/149,816, filed May 31, 2011, Karaffa et al.
U.S. Appl. No. 13/149,826, filed May 31, 2011, Karaffa et al.
U.S. Appl. No. 13/149,597, filed May 31, 2011, Karaffa et al.
U.S. Appl. No. 13/149,833, filed May 31, 2011, Karaffa et al.
U.S. Appl. No. 13/149,803, filed May 31, 2011, Karaffa et al.
U.S. Appl. No. 13/149,660, filed May 31, 2011, Karaffa et al.
U.S. Appl. No. 13/149,706, filed May 31, 2011, Karaffa et al.
U.S. Appl. No. 13/149,746, filed May 31, 2011, Karaffa et al.
U.S. Appl. No. 13/149,811, filed May 31, 2011, Karaffa et al.
U.S. Appl. No. 13/040,917, filed Mar. 4, 2011, Nekkar et al.
U.S. Appl. No. 13/103,864, filed May 9, 2011, Ojha et al.
U.S. Appl. No. 13/106,741, filed May 12, 2011, Ojha et al.
http://zone.ni.com/devzone/cda/tut/p/id/3345, 12 pages, last viewed Aug. 2, 2011.

* cited by examiner

*Primary Examiner* — Daryl Pope
(74) *Attorney, Agent, or Firm* — Fletcher Yoder, P.C.

(57) ABSTRACT

An industrial control system is provided that includes a field device configured to provide an alert having a first parameter and a controller configured to receive the alert and overlay a second plurality of parameters on the alert, wherein the controller is configured to transmit the alert having the first parameter and the second plurality of parameters.

20 Claims, 7 Drawing Sheets

SYSTEMS AND METHODS TO OVERLAY ADDITIONAL INFORMATION ONTO FOUNDATION FIELDBUS ALERTS

BACKGROUND OF THE INVENTION

The subject matter disclosed herein relates to industrial control systems and, more specifically, to the communication and processing of alerts in an industrial control system.

Certain systems, such industrial control systems, may provide for control capabilities that enable the execution of control instructions in various types of devices, such as sensors, pumps, valves, and the like. Additionally, certain industrial control systems may include one or more graphical user interfaces that may be used to present details to an operator about the various devices present on the control system network. For example, a graphical user interface may present an operator with alerts that may contain alarm or diagnostic information about a device on the control system network.

BRIEF DESCRIPTION OF THE INVENTION

In one embodiment, a system is provided that includes a field device configured to provide an alert having a first parameter, and a controller of an industrial control system configured to receive the alert and overlay a second plurality of parameters on the alert, wherein the controller is configured to transmit the alert having the first parameter and the second plurality of parameters.

In another embodiment, a method is provided that includes receiving an alert from a field device at a controller of an industrial control system, wherein the alert comprises a first parameter, overlaying, via a processor of the controller, a second parameter on the alert, and transmitting the alert having the first parameter and the second parameter to a computer of an industrial control system.

In another embodiment, a non-transitory tangible machine-readable media is provided that includes executable code stored thereon. The executable code includes instructions for receiving an alert from a field device at a controller of an industrial control system, wherein the alert comprises a first parameter, overlaying, via a processor of the controller, a second parameter on the alert, and transmitting the alert to a computer of an industrial control system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The Foundation Fieldbus standard includes the concept of Foundation Fieldbus alerts, which are used by Foundation Fieldbus devices to inform a controller or other component of an industrial control system of events or alarms that devices may experience. The Foundation Fieldbus alert may include one or more parameters that include information about the alert. However, other components of the industrial control system 10 may be able to use additional information not provided by the Foundation Fieldbus alert parameters.

The embodiments of the invention discussed below provide for the overlay of additional information on a Foundation Fieldbus alert. For example, the embodiments may include the overlay of a second set of parameters on a Foundation Fieldbus alert having a first set of parameters. In some embodiments, a Foundation Fieldbus alert may be generated by a device and transmitted to a controller. The controller may overlay a second set of parameters on the alert and transmit the alert to other components of the industrial control system. Additionally, embodiments include a graphical user interface that enables a user to review and select values for the second set of parameters for alerts of a Foundation Fieldbus device.

Figure 1:
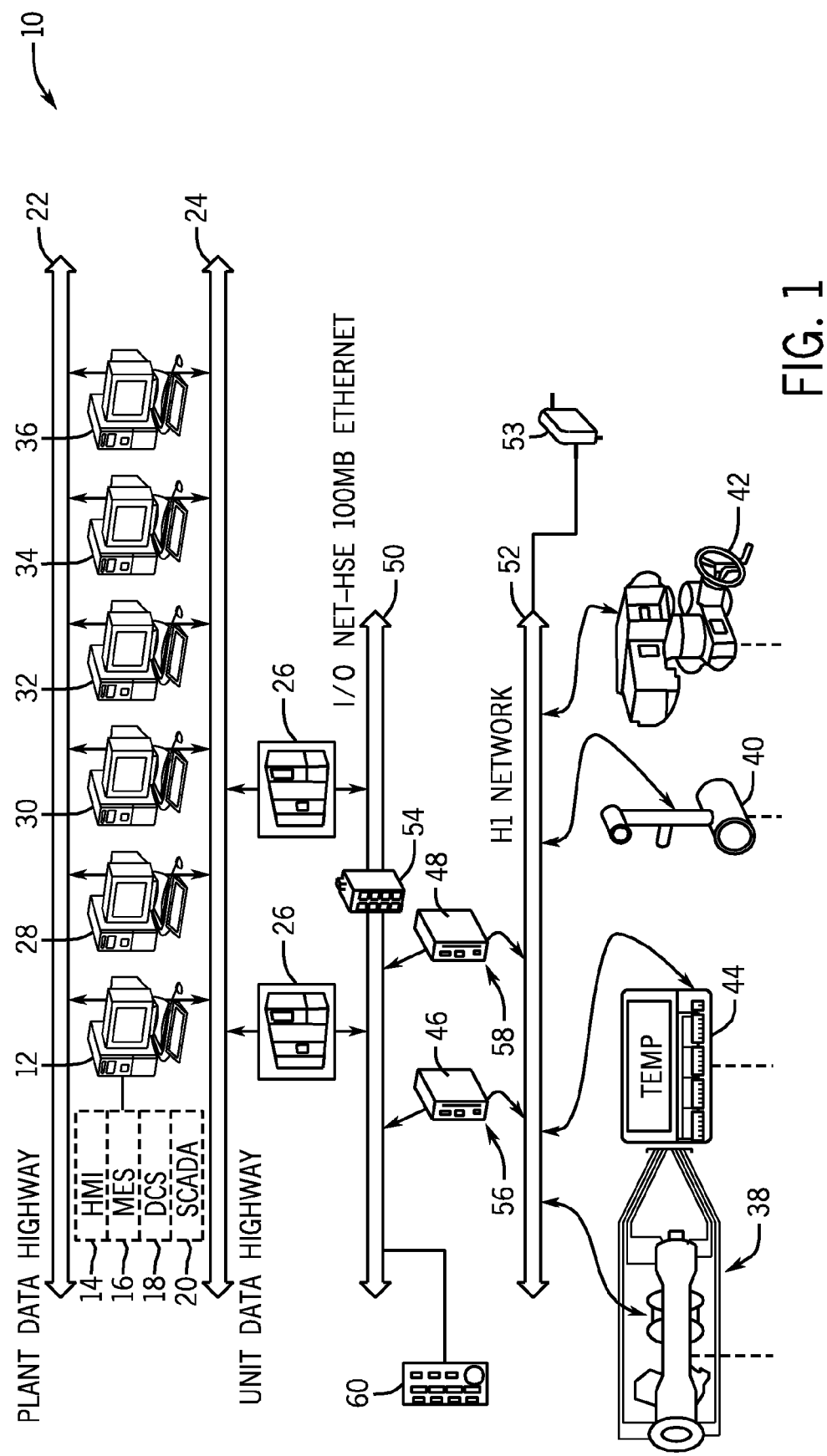
FIG. 1 is a schematic diagram of an embodiment of an industrial control system, including a communications bus.

Turning to FIG. 1, an embodiment of an industrial process control system 10 is depicted. The control system 10 may include a computer 12 suitable for executing a variety of field device configuration and monitoring applications, and for providing an operator interface through which an engineer or technician may monitor the components of the control system 10. The computer 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms. In accordance with one embodiment, the computer 12 may host an industrial control software, such as a human-machine interface (HMI) software 14, a manufacturing execution system (MES) 16, a distributed control system (DCS) 18, and/or a supervisor control and data acquisition (SCADA) system 20. For example, the computer 12 may host the ControlST™ software, available from General Electric Co., of Schenectady, N.Y.

Further, the computer 12 is communicatively connected to a plant data highway 22 suitable for enabling communication between the depicted computer 12 and other computers 12 in the plant. Indeed, the industrial control system 10 may include multiple computers 12 interconnected through the plant data highway 22. The computer 12 may be further communicatively connected to a unit data highway 24, suitable for communicatively coupling the computer 12 to industrial controllers 26. The system 10 may include other computers coupled to the plant data highway 22 and/or the unit data highway 24. For example, embodiments of the system 10 may include a computer 28 that executes a virtual controller, a computer 30 that hosts an Ethernet Global Data (EGD) configuration server, an Object Linking and Embedding for Process Control (OPC) Data Access (DA) server, an alarm server, or a combination thereof, a computer 32 hosting a General Electric Device System Standard Message (GSM) server, a computer 34 hosting an OPC Alarm and Events (AE) server, and a computer 36 hosting an alarm viewer. Other computers coupled to the plant data highway 22 and/or the unit data highway 24 may include computers hosting Cimplicity™, ControlST™, and ToolboxST™, available from General Electric Co., of Schenectady, N.Y.

The system 10 may include any number and suitable configuration of industrial controllers 26. For example, in some embodiments the system 10 may include one industrial controller 26, two industrial controllers 26, three, or more industrial controllers for redundancy. The industrial controllers 26 may enable control logic useful in automating a variety of plant equipment, such as a turbine system 38, a valve 40, and a pump 42. Indeed, the industrial controllers 26 may communicate with a variety of devices, including but not limited to temperature sensors 44, flow meters, pH sensors, temperature sensors, vibration sensors, clearance sensors (e.g., measuring distances between a rotating component and a stationary component), and pressure sensors. The industrial controller 26 may further communicate with electric actuators, switches (e.g., Hall switches, solenoid switches, relay switches, limit switches), and so forth.

In the depicted embodiment, the turbine system 38, the valve 40, the pump 42, and the temperature sensor 44 are communicatively interlinked to the automation controller 26 by using linking devices 46 and 48 suitable for interfacing between an I/O NET 50 and a H1 network 52. For example, the linking devices 46 and 48 may include the FG-100 linking device, available from Softing AG, of Haar, Germany. In some embodiments, a linking device, such as the linking device 48, may be coupled to the I/O NET through a switch 54. In such an embodiment, other components coupled to the I/O NET 50, such as one of the industrial controllers 26, may also be coupled to the switch 54. Accordingly, data transmitted and received through the I/O NET 50, such as a 100 Megabit (MB) high speed Ethernet (HSE) network, may in turn be transmitted and received by the H1 network 52, such as a 31.25 kilobit/sec network. That is, the linking devices 46 and 48 may act as bridges between the I/O Net 50 and the H1 network 52.

A variety of devices may be linked to the industrial controller 26 and to the computer 12. For example, the devices, such as the turbine system 38, the valve 40, the pump 42, and the temperature sensor 44, may include industrial devices, such as Foundation Fieldbus devices that include support for the Foundation H1 bi-directional communications protocol. In such an embodiment, a Foundation Fieldbus power supply 53, such as a Phoenix Contact Fieldbus Power Supply available from Phoenix Contact of Middletown, Pa., may also be coupled to the H1 network 52 and may be coupled to a power source, such as AC or DC power. The power supply 53 may be suitable for providing power to the devices 38, 40, 42, and 44, as well as for enabling communications between the devices 38, 40, 42, and 44. Advantageously, the H1 network 52 may carry both power and communications signals (e.g., alert signals) over the same wiring, with minimal communicative interference. The devices 38, 40, 42, and 44 may also include support for other communication protocols, such as those included in the HART® Communications Foundation (HCF) protocol, and the Profibus Nutzer Organization e.V. (PNO) protocol.

Each of the linking devices 46 and 48 may include one or more segment ports 56 and 58 useful in segmenting the H1 network 52. For example, the linking device 46 may use the segment port 56 to communicatively couple with the devices 38 and 44, while the linking device 48 may use the segment port 58 to communicatively couple with the devices 40 and 42. Distributing the input/output between the devices 38, 44, 40, and 42 by using, for example, the segment ports 56 and 58, may enable a physical separation useful in maintaining fault tolerance, redundancy, and improving communications time. In some embodiments, additional devices may be coupled to the I/O NET 50. For example, in one embodiment an I/O pack 60 may be coupled to the I/O NET 50. The I/O pack 60 may provide for the attachment of additional sensors and actuators to the system 10.

Figure 2:
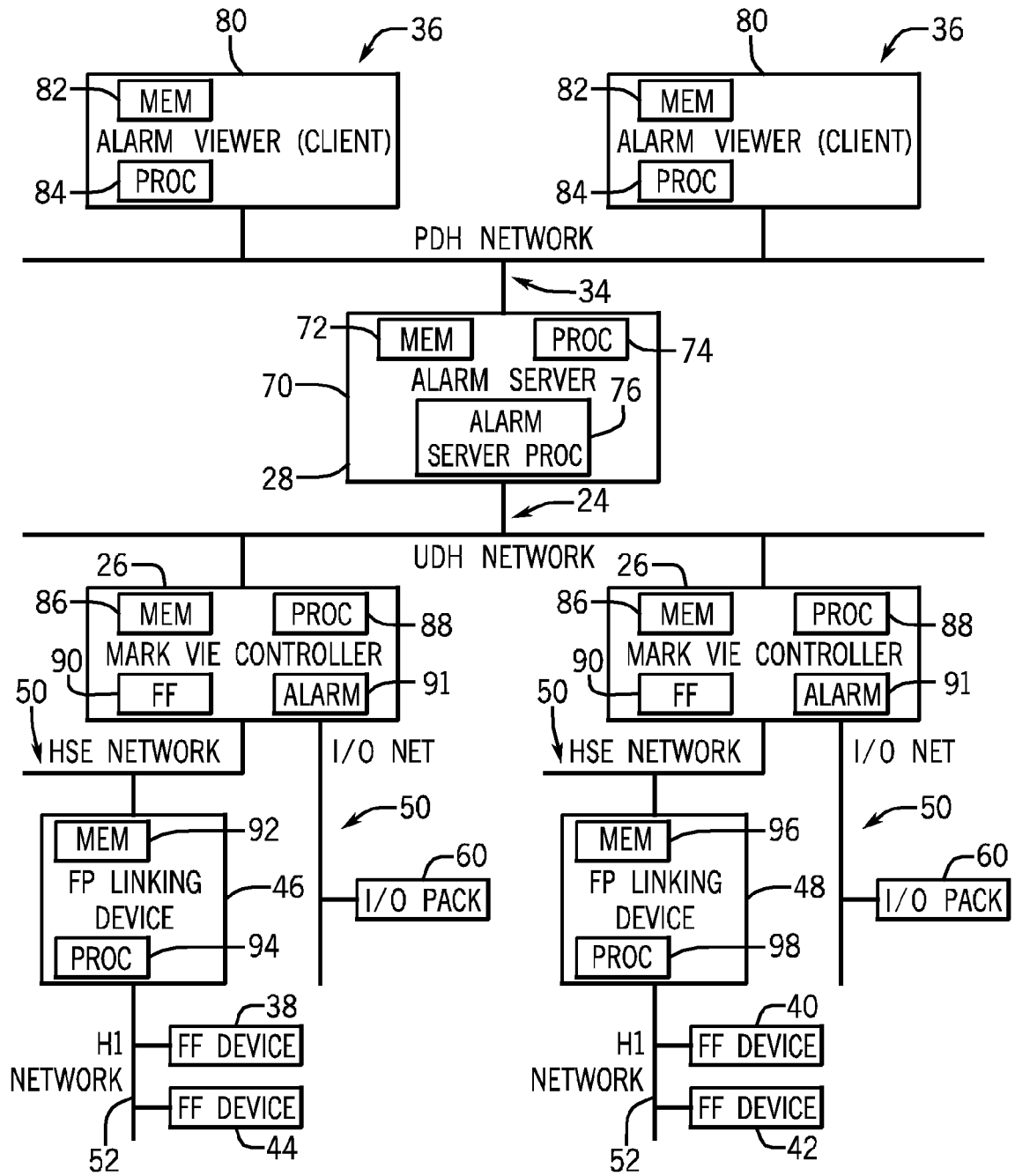
FIG. 2 is a block diagram including embodiments of various components of the industrial control system of FIG. 1.

In certain embodiments, the devices 38, 40, 42, and 44 may provide data, such as alerts, to the system 10. These alerts may be handled in accordance with the embodiments described below. FIG. 2 depicts a block diagram of an embodiment of the industrial process control system 10 depicting various components in further detail. As described above, the system 10 may include an alarm server 70, executed on the computer 28, coupled to the plant data highway 22 and the unit data highway 24. The computer 28 may include a memory 72, such as non-volatile memory and volatile memory, and a processor 74, to facilitate execution of the alarm server 70. The alarm server 70 may execute an alarm server process 76 for receiving, processing, and responding to alarms received from the controllers 26. Multiple controllers, such as the controllers 26 may be set up for redundant operations.

The system 10 may include additional computers 36 coupled to the plant data highway 22 that may execute alarm viewers 80. The alarm viewers 80 may enable a user to view and interact with the alarms processed by the alarm server 70. The computers 36 may each include a memory 82 and a processor 84 for executing the alarm viewer 80. Additionally, in some embodiments, the alarm viewers 80 may be executed on the computer 28 or any of the computers described above in FIG. 1. The alarm server 70 may communicate with the alarm viewers 80 using any suitable alarm data protocol interpretable by the alarm viewers 80.

As described above, the controllers 26 are coupled to the unit data highway 24, and the controllers 26 may communicate with the alarm server 70 over the unit data highway 24. For example, in one embodiment, the controllers 26 and alarm server 70 may communicate using a serial data interface (SDI) alarm protocol. The controllers 26 may each include a memory 86 and a processor 88 for executing the functions of the controllers 26. In one embodiment, the controllers 26 may execute a Fieldbus process 90 and an alarm process 91. The Fieldbus process 90 may be used to interface with the field devices 38, 40, 42, and 44 while the alarm process 91 may be used to provide for a centralized facility suitable for distributing alarm information. As mentioned above, the controllers 26 may be coupled to the I/O pack 60 over the I/O NET 50. In one embodiment, the I/O pack 60 may communicate with the controllers 26 using the advanced digital logic (ADL) protocol.

As also described above, the controllers 26 may be coupled to linking devices 46 and 48 through an I/O NET 50. The linking devices 46 and 48 may communicate with the controllers 26 over the I/O NET 50. The linking devices 46 and 48 may also be coupled to the H1 network 52, and one linking device 46 may be coupled to devices 38 and 44 and another linking device 48 may be coupled to devices 40 and 42. The linking device 46 may include a memory 92, such as volatile and non-volatile memory, and a processor 94, and the linking device 48 may include a memory 96, such as volatile and non-volatile memory, and a processor 98. In one embodiment, the linking devices 46 and 48 may communicate with the controllers 26 using the Foundation Fieldbus protocol.

The system 10 may enable alert and diagnostic information to be communicated from the various devices to a user, such as through the HMI 14 and the alarm viewers 80. For example, the Foundation Fieldbus devices 38, 40, 42, and 44 may provide an alert to the controller 26. The alert may be provided from the controller 26 to the alarm server 70, which may process the alert and provide information to the HMI 14, the alarm viewers 80, or any other computers coupled to the unit data highway 24 or plant data highway 22.

As such, the Foundation Fieldbus standard relies on Foundation Fieldbus alerts, which are used by Foundation Fieldbus devices (e.g., devices 38, 40, 42, and 44) to communicate to the system controllers (e.g., controller 26) alarms and diagnostic information regarding the status of the devices. The Foundation Fieldbus alerts provided from Foundation Fieldbus devices include one or more parameters that provide information about the alerts. However, some components of the industrial control system 10 may be able to use additional information not provided by the parameters included with the Foundation Fieldbus alerts.

Figure 3:
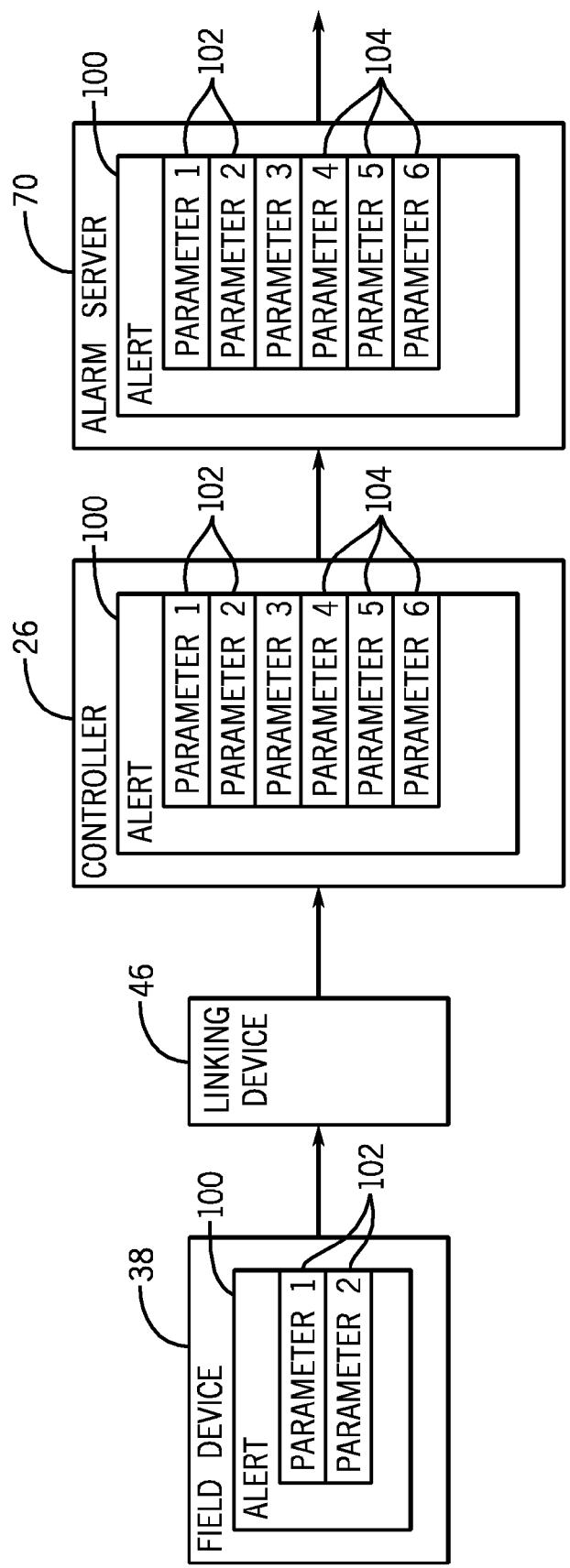
FIG. 3 is a block diagram depicting the overlay of additional parameters on an alert from a field device in accordance with an embodiment of the present invention.

FIG. 3 depicts the overly of additional information, e.g., additional parameters, on a Foundation Fieldbus alert in accordance with an embodiment of the present invention. As shown in FIG. 3, a Foundation Fieldbus device, (e.g., device 38), may generate an alert 100. The alert 100 may correspond to an alarm, e.g., a diagnostic alarm of the device 38, or an event of the device 38. As shown in FIG. 3, the alert 100 may include a first set of parameters 102, e.g., "Parameter1" and "Parameter2."

FIG. 3 also illustrates transmission of the alert 100 through the various components of the industrial control system 10. The alert 100 may be transmitted to the linking device 46, such as through a multicast broadcast from the device 38. The linking device 46 may then transmit the alert 100 to the controller 26 for processing, which in turn may transmit the alert 100 to the alarm server 70. In processing the alert 70, the controller 26 may overlay a second set of parameters 104 on the alert 100. As described further below, the values for the second set of parameters 104 may be defined by a user during creation of the alert 100.

Thus, as shown in FIG. 3, the controller 100 overlays a second set of parameters 104 on the alert 100. The alert 100 may then include both the first set of parameters 102 and the second set of parameters 104. As the alert 100 is communicated to other components of the system 10, such as the alarm server 70, the second set of parameters 104 may be used for processing and display of the alert 100. For example, the second set of parameters 104 may be displayed on the alert viewers 80, ControlST™, or other components of the system.

Figure 4:
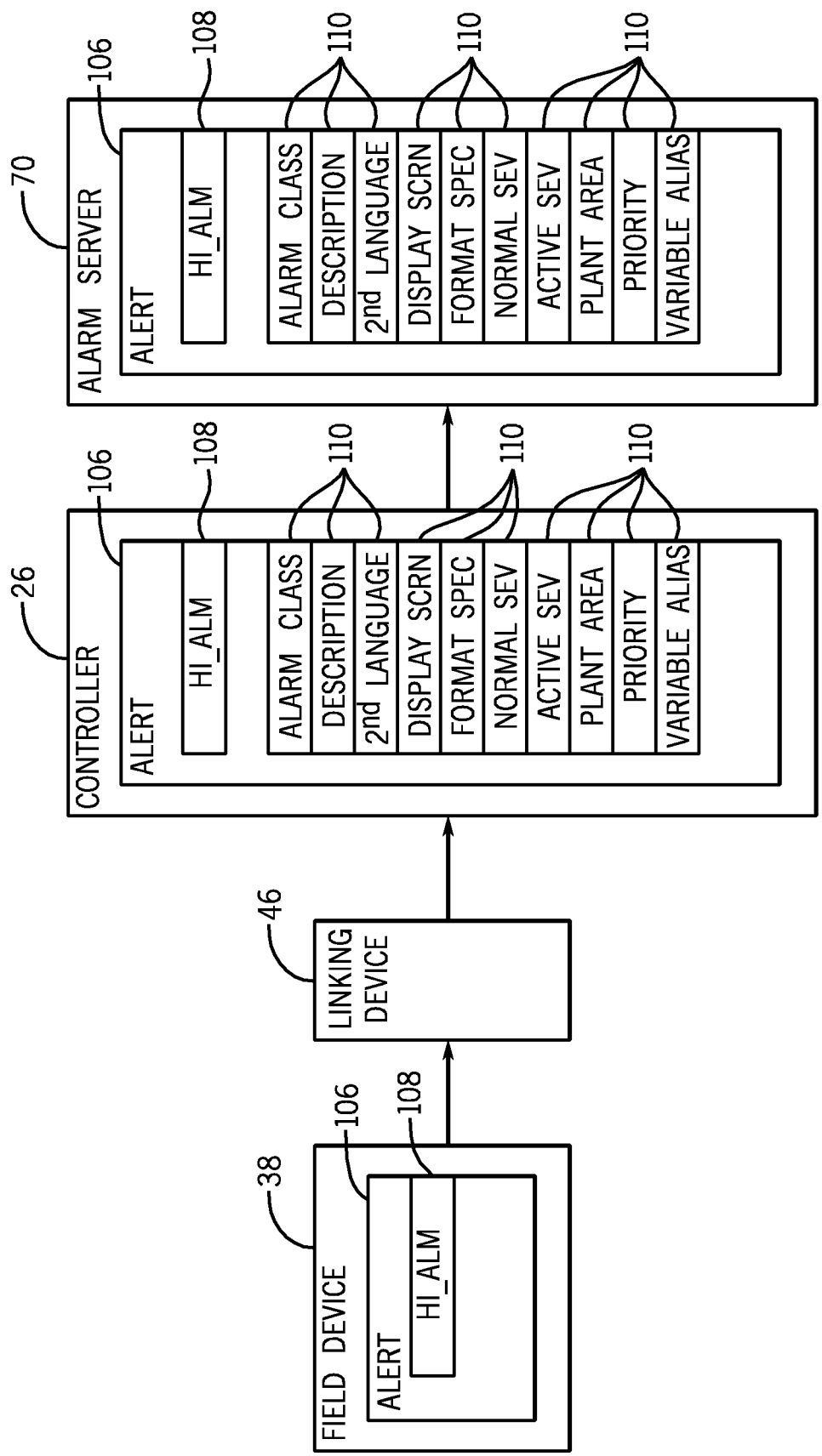
FIG. 4 is a block diagram depicting the overlay of additional parameters on a Foundation Fieldbus alert of a Foundation Fieldbus device in accordance with an embodiment of the present invention.

FIG. 4 depicts in further detail of the overlay of additional information on a Foundation Fieldbus alert in accordance with an embodiment of the present invention. As shown in FIG. 4, a Foundation Fieldbus device, e.g., the device 38, may generate a Foundation Fieldbus alert 106 from an alarm. The alert 106 may include a Foundation Fieldbus alarm parameter 108, such as HI_ALM, the current state of the high alarm and a time and data stamp. Other alarm parameters that may be included in a Foundation Fieldbus alert may include error conditions detected within a function block (BLOCK_ALM), the current state of the discrete alarm (DISC_ALM), the current state of the deviation high alarm (DIV_HI_ALM), the current state of the deviation low alarm (DIV_LO_ALM), the current state of the high-high alarm (HI_HI_ALM), the current state of the low alarm (LO_ALM), the current state of the low-low alarm (LO_LO_ALM), and the state of the alert generated if a write lock is cleared (WRITE_ALM). Each of these parameters may also include a time and date stamp.

As described above, the alert 106 that includes the HI_ALM parameter 108 may be transmitted to the linking device 46, such as through a multicast broadcast from the device 38. The linking device 46 may then transmit the alert 100 to the controller 26 for processing. As described above, the controller 26 may overlay a second set of parameters 110 on the alert 100. As shown in FIG. 4, the alert 100 received at the controller 26 includes the HI_ALM parameter 108. However, the alert 100 may also include the second set of parameters 110. In some embodiments, the second set of parameters 110 may include parameters supported by ControlST™. For example, as shown in FIG. 4, such parameters may include Alarm Class (based on a predefined classes for an alarm), Description, 2nd Description (e.g., a second language description), Display Screen (specifying the screen on which the alert is displayed), Format Specification (specifying the format for displaying the alert), a Normal Severity, an Active Severity, Plant Area, Priority (as defined in the Alarm Class) and Variable Alias (an alias for the alert).

As also mentioned above, the alert 100 that includes the HI_ALM parameter 108 and the second set of parameters 110 may be transmitted to the alarm server 70 for further processing and communication to other elements of the system 10. The alarm server 70 may receive the alert 100, and the parameters 108 and 110, and may rely on the second set of the parameters 110 for additional processing. For example, as described below, the second set of parameters 110 may be displayed in a graphical user interface for review and configuration by a user.

Figure 5:
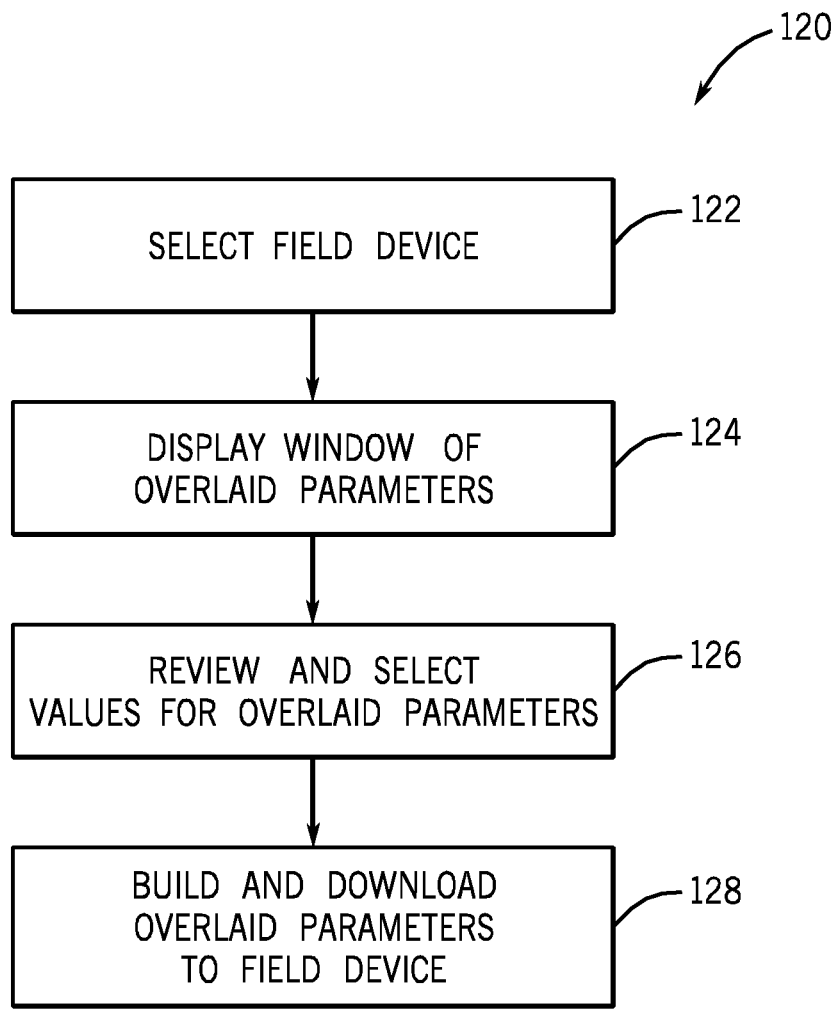
FIG. 5 is a flowchart of a process for overlaying parameters on a Foundation Fieldbus alert of a Foundation Fieldbus device in accordance with an embodiment of the present invention.

FIG. 5 depicts a process 120 for configuring a second set of parameters for a Foundation Fieldbus alert in accordance with an embodiment of the present invention. Some or all steps of the process 120 may be implemented as executable code instructions stored on non-transitory tangible computer-readable media and executed by a processor, such as the memory 86 and processor 88 of the controller 26, or the memory 72 and processor 74 of the alarm server 70. Initially, a user may select a field device, e.g., a Foundation Fieldbus device, of the system 10 (block 122), such as by selecting a linking device, a segment of a linking device, and the device in a graphical user interface. Upon selection of the device, a window, pane, or other element of the graphical user interface may display the overlaid parameters (block 124). For example, in some embodiments, a user may select a "Hardware" tab of a user interface to select corresponding Fieldbus Resources, Transducers, or Function Blocks of the device. Additionally, in some embodiments, the user may select a "Software" tab to select a corresponding Foundation Fieldbus Function Block of the device 38.

After selection of the appropriate element, a user may then select values for one or more of the overlaid parameters (block 126). In some embodiments, one or more of the overlaid parameters may have a default value that is automatically selected. Additionally, one or more of the overlaid parameters may not have a default value and may remain empty until a value is selected by the user. After configuration of the overlaid parameters, the user may then "build" and "download" the changes to the device (block 128). Subsequently, alerts generated from the device may include the overlaid parameters configured by the user, as described above.

Figure 6:
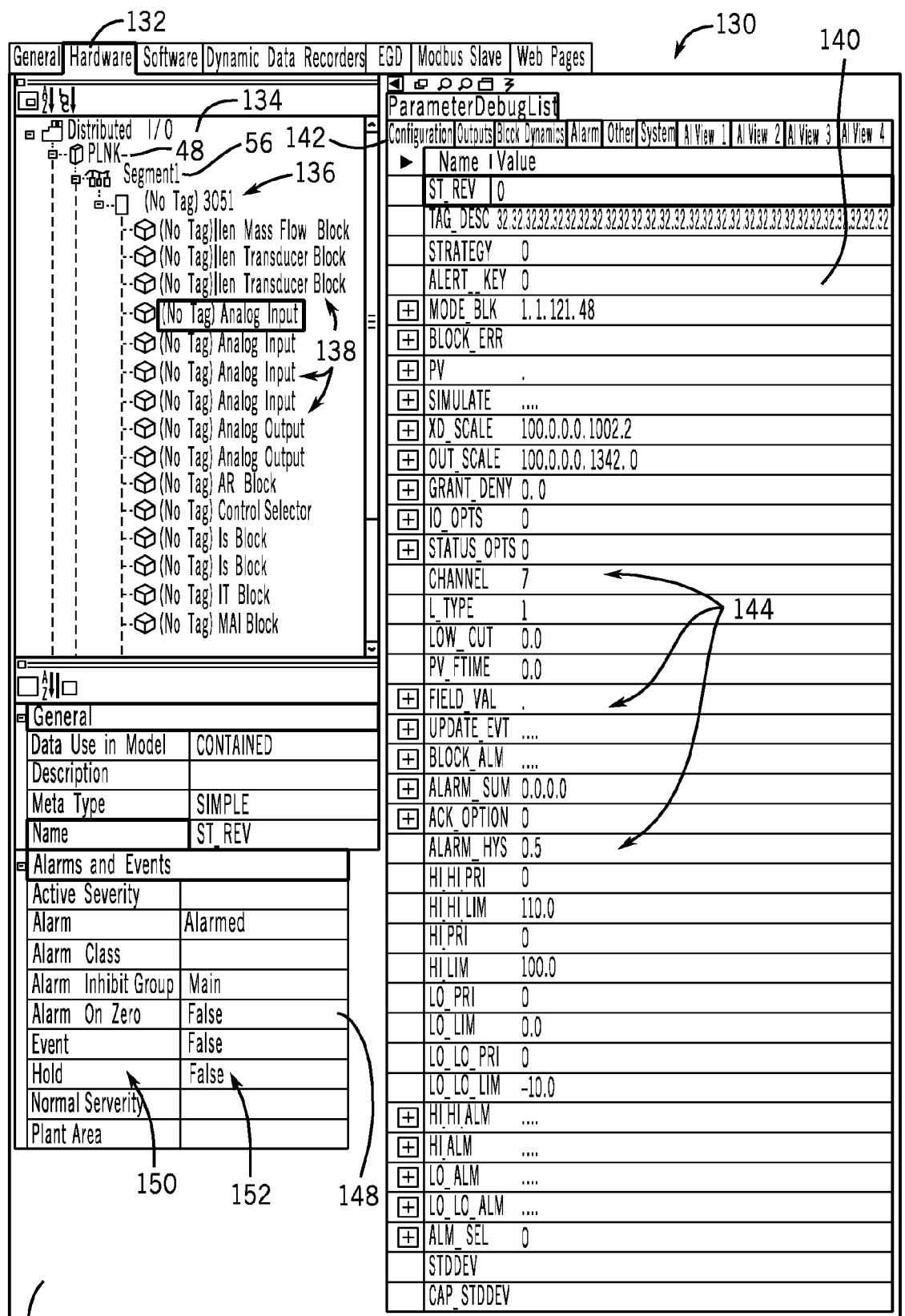
FIGS. 6 and 7 are screenshots of a graphical user interface depicting the overlay of additional parameters on a Foundation Fieldbus alert of a Foundation Fieldbus device in accordance with an embodiment of the present invention.

FIG. 6 is a screenshot of a graphical user interface 130 for viewing and configuring overlaid parameters of a Foundation Fieldbus device in accordance with an embodiment of the present invention. The graphical user interface 130 may be implemented as executable code instructions stored on non-transitory tangible computer-readable media and executed by a processor, such as the memory the memory 72 and processor 74 of the alarm server 70, or the memory 82 and processor 84 of the alarm viewers 80.

As shown in FIG. 6, a "Hardware" tab 132 of the interface 130 may be selected. A first pane 134 of the tab 132 may include a tree view 136 having a linking device (e.g., linking device 48), a segment (e.g., segment port 56), and a Foundation Fieldbus device (e.g., field device 38). The tree view 136 may also display the hardware components 138 of the field device 38, such as Fieldbus Resources, Transducers, and Function Blocks. The interface 130 may include a second pane 140 illustrating various additional selectable tabs for the device 38, such as the selected "Configuration" tab 142 that depicts Foundation Fieldbus parameters 144 of the device 38. Additionally, the interface 130 may include a third pane 146 that includes a grid section 148 ("Alarms and Events") that displays the overlaid parameters 150. The grid section 148 displays each of the overlaid parameters 150 and the respective values 152 for each of the parameters 150. From this grid section 148, a user may review each of the parameters 150 and select the desired values for each of the parameters 150.

Figure 7:
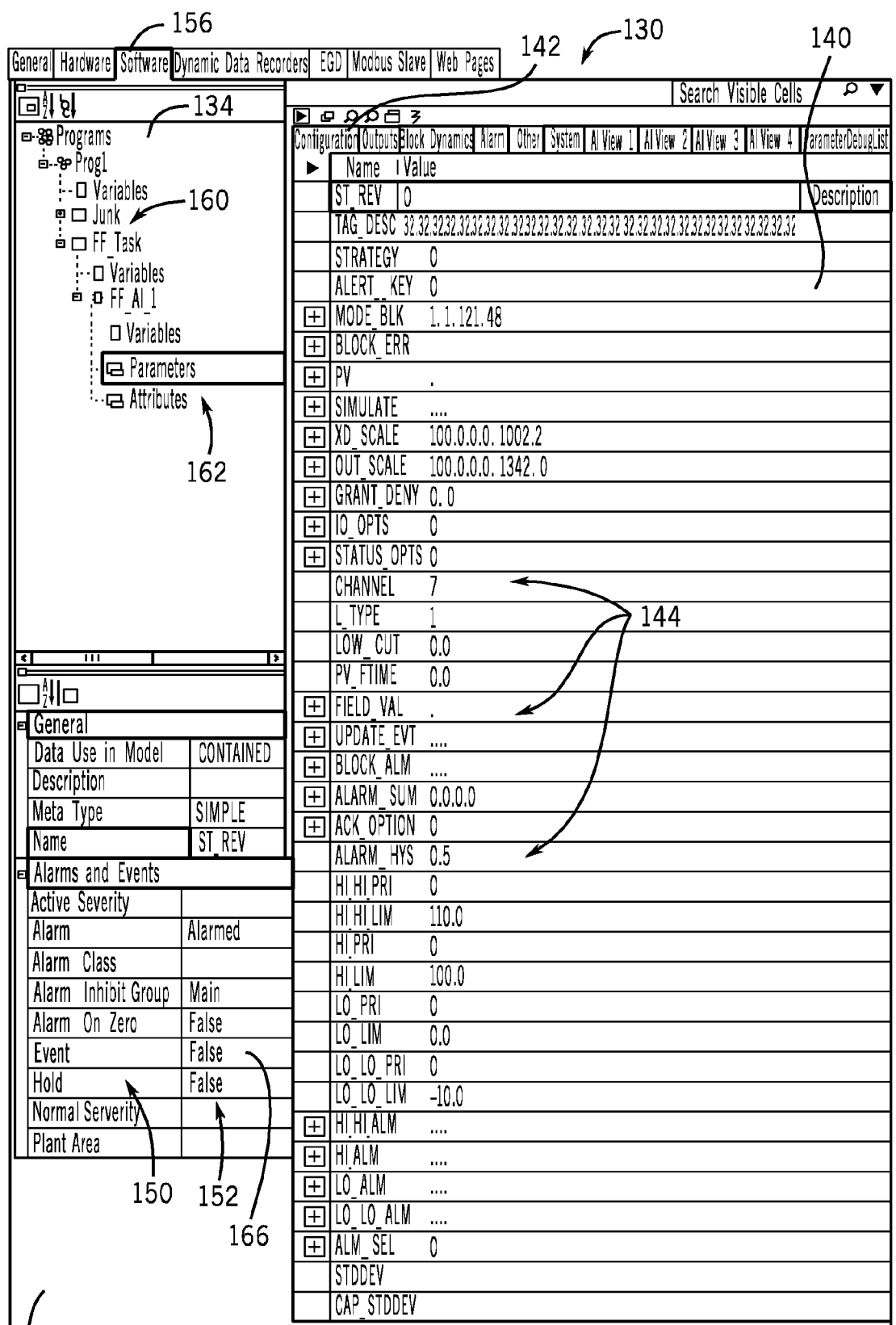

FIG. 7 is a screenshot of the graphical user interface 130 depicting the viewing and configuration of the overlaid parameters 150 through a "Software" tab 156 in accordance with an embodiment of the present invention. As shown in FIG. 7, a "Software" tab 156 of the interface 130 may be selected. The first pane 134 of the interface 130 may include a tree view 160 depicting various software components 162 of a selected Foundation Fieldbus device (e.g., device 38), such as the Foundation Fieldbus Function Blocks of the device 38. As mentioned above, the interface 130 may include a second pane 140 illustrating various additional selectable tabs for the device 38, such as the selected "Configuration" tab 142 that depicts the Foundation Fieldbus parameters 144 of the device 38.

Additionally, the interface 130 includes a third pane 164 having a grid section 166 ("Alarms and Events") that displays the overlaid parameters 150. The grid section 160 displays each of the overlaid parameters 150 and the respective values 152 for each of the parameters 150. As discussed above, from this grid section 160, a user may review each of the parameters 150 and select the desired values for each of the parameters 150.

Technical effects of the invention include the overlay of additional parameters on a Foundation Fieldbus alert of a Foundation Fieldbus device. Additional technical effects include providing additional parameters not supported by a Foundation Fieldbus alert for use in a control system for processing of the alert. Additional technical effects include providing an interface for a user to view and configure the overlaid parameters.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a field device configured to provide an alert having a first parameter, wherein the first parameter adheres to a first industrial communications protocol alert parameter supported by the field device; and
a controller of an industrial control system configured to receive the alert and overlay a second plurality of parameters on the alert wherein the second plurality of parameters are not included in the first industrial communications protocol, wherein the controller is configured to transmit the alert having the first parameter and the second plurality of parameters, and wherein the controller is configured to transmit signals suitable for controlling a device included in the industrial control system.

2. The system of claim 1, wherein the field device comprises a Foundation Fieldbus device.

3. The system of claim 2, wherein the alert comprises a Foundation Fieldbus alert and the first parameter comprises a Foundation Fieldbus parameter and wherein the second plurality of parameters are not included in the Foundation Fieldbus protocol.

4. The system of claim 1, wherein the second plurality of parameters comprises a primary description, a secondary description, an alarm class, and an alias.

5. The system of claim 1, comprising an alarm server, wherein the controller is configured to transmit the alert to the alarm server.

6. The system of claim 1, comprising a graphical user interface configured to provide the second plurality of parameters.

7. The system of claim 6, wherein the graphical user interface is configured to provide for selection of a respective plurality of values for the second plurality of parameters.

8. The system of claim 7, wherein the graphical user interface comprises a graphical user interface on a human-machine interface (HMI) system, a manufacturing execution system (MES), a distributed control system (DCS), a supervisor control and data acquisition (SCADA) system, or an alarm viewer.

9. The system of claim 1, comprising a linking device, a high speed Ethernet network, and a Foundation H1 network, wherein the linking device is configured to link the high speed Ethernet network to the Foundation H1 network, the controller is coupled to the high speed Ethernet network, and the field device is coupled to the Foundation H1 network.

10. The system of claim 9, wherein the field device is configured to provide the alert over the Foundation H1 network, and the controller is configured to receive the alert over the high speed Ethernet network.

11. A method, comprising:
receiving an alert from a field device at a controller of an industrial control system, wherein the alert comprises a first parameter, wherein the first parameter adheres to a first industrial communications protocol alert parameter supported by the field device;
overlaying, via a processor of the controller, a second parameter on the alert wherein the second plurality of parameters are not included in the first industrial communications protocol, and wherein the controller is configured to transmit signals suitable for controlling a device included in the industrial control system; and transmitting the alert having the first parameter and the of second parameter to a computer of an industrial control system.

12. The method of claim 11, wherein the computer comprises an alarm server, a human-machine interface (HMI) system, a manufacturing execution system (MES), a distributed control system (DCS), or a supervisor control and data acquisition (SCADA) system.

13. The method of claim 11, wherein the field device comprises a Foundation Fieldbus device, the alert comprises a Foundation Fieldbus alert, and the first parameter comprises a Foundation Fieldbus parameter and wherein the second plurality of parameters are not included in the Foundation Fieldbus protocol.

14. The method of claim 11, wherein the alert comprises a third parameter.

15. The method of claim 11, comprising displaying the alert in a graphical user interface of the computer.

16. A non-transitory tangible machine-readable media comprising executable code stored thereon, wherein the executable code comprises instructions for:

receiving an alert from a field device at a controller of an industrial control system, wherein the alert comprises a first parameter, wherein the first parameter adheres to a first industrial communications protocol alert parameter supported by the field device;

overlaying, via a processor of the controller, a second parameter on the alert wherein the second parameter is not included in the first industrial communications protocol; and transmitting the alert to a computer of an industrial control system, wherein the controller is configured to transmit signals suitable for controlling a device included in the industrial control system.

17. The non-transitory tangible machine-readable media of claim 16, wherein the computer comprises an alarm server.

18. The non-transitory tangible machine-readable media of claim 16, wherein the field device comprises a Foundation Fieldbus device, the alert comprises a Foundation Fieldbus alert, and the first parameter comprises a Foundation Fieldbus parameter and wherein the second parameter is not included in the Foundation Fieldbus protocol.

19. The non-transitory tangible machine-readable media of claim 18, wherein the Foundation Fieldbus parameter comprises a Foundation Fieldbus alarm parameter.

20. The non-transitory tangible machine-readable media of claim 16, wherein transmitting the alert comprises transmitting the alert over a unit data highway coupled to the controller.

* * * * *